United States Patent [19]

Witzke et al.

[11] Patent Number: 4,970,123

[45] Date of Patent: Nov. 13, 1990

[54] ISOTROLPICALLY REINFORCED NET-SHAPE MICROCOMPOSITES

[75] Inventors: Horst Witzke, Flemington; Bernard H. Kear, Whitehouse Station, both of N.J.

[73] Assignee: Exxon Research and Engineering Company, Florham Park, N.J.

[21] Appl. No.: 477,699

[22] Filed: Feb. 9, 1990

Related U.S. Application Data

[63] Continuation-in-part of Ser. No. 113,986, Oct. 29, 1987, Pat. No. 4,900,483.

[51] Int. Cl.$^5$ .............. B32B 1/00; B32B 1/10; B32B 15/04; B32B 19/06; B32B 27/04
[52] U.S. Cl. .............. 428/545; 156/307.7; 264/29.2; 264/29.6; 264/82; 264/135; 264/137; 264/257; 264/299; 423/447.2; 423/447.3; 423/447.5; 423/447.7; 423/453; 427/52; 427/249; 427/250; 428/549; 428/283; 428/288; 428/289; 428/290; 428/408; 428/413; 428/418; 428/469; 428/539.5; 428/689; 428/699; 501/95; 501/99

[58] Field of Search .............. 264/29.2, 29.6, 82, 264/135, 137, 257, 299; 423/447.3, 447.5, 447.7, 453, 447.2; 427/52, 249, 250; 156/307.7; 428/288, 289, 290, 408, 539.5, 545, 283, 221, 549; 501/95, 99

[56] References Cited

U.S. PATENT DOCUMENTS

4,900,483  2/1990  Whitzke .............. 264/29.2

Primary Examiner—James C. Cannon
Attorney, Agent, or Firm—Maurice L. Williams

[57] ABSTRACT

A novel isotropically reinforced microcomposite is described. An entirely fluid-phase method has been devised for producing the net-shape filamentary structures. The process depends for its success on the ability to generate in situ, within a shaped mold, a three-dimensional random weave of carbon filaments by catalytic decomposition of a hydrocarbon feed. Almost any desired filament filler matrix combination can be produced by utilizing chemical vapor deposition to modify the surface and bulk properties of the filamentary structure. Infiltration of filler matrix materials can be achieved by adaptation of existing materials technologies.

16 Claims, 5 Drawing Sheets

ISOTROLPICALLY REINFORCED NET-SHAPE MICROCOMPOSITES

CROSS REFERENCE TO RELATED APPLICATION

This application is a Continuation-in-Part of U.S. Pat. Ser. No. 113,986 filed Oct. 29, 1987, now U.S. Pat. No. 4,900,483.

A novel isotropically reinforced microcomposite is described. An entirely fluid-phase method has been devised for producing a net-shape filamentary reinforced structure. The process depends for its success on the ability to generate in situ, within a shaped mold, a three-dimensional random weave of carbon filaments by catalytic decomposition of a hydrocarbon feed. Almost any desired filamentary structure can be produced by utilizing chemical vapor deposition to modify the surfaces of the filaments. Infiltration of filler matrix materials can be achieved by adaptation of existing materials technologies.

BACKGROUND OF THE INVENTION

Processes for the catalytic production of carbon from hydrocarbon gases and CO were proposed and patented as early as 1920 (U.S. Pats. No. 1,352,162; 1,868,921; 1,882,813). These patents identified the product as "carbon black," but it is clear from the experimental conditions that filamentary carbon was formed. The preferred catalysts were iron, cobalt and nickel or their oxides.

More recent work on filamentous carbon synthesis has been reported by a number of academic and industrial organizations throughout the world. Baker and Harris published a comprehensive review of the field in 1978 ("Chem. and Phys. of Carbon," 14, 83–165 [1978]). Most of the work has centered on the use of Fe as the hydrocarbon decomposition catalyst, although many of the patent disclosures claim Group VIII metals in general. The preferred gases are CO, the $C_1$-$C_3$ alkanes and benzene, but much broader classes of hydrocarbons are often claimed.

Baker and co-workers have carried out extensive studies on the catalytic formation of filamentous carbon, by decomposition of acetylene at temperatures between approximately 500° to 975° C. in the presence of Fe, CO and Cr catalysts supported on single crystals of graphite and silicon ("J. Catal." 30(1), 86–95 [1973]), or over nickel films ("J. Catal." 26(1), 51–62 [1972]). Each of the filaments was observed to have a catalyst particle as its growing tip, where the diameter of the filaments was fixed by that of the catalyst particle. The filaments, diameter and length varied respectively between 0.01–0.15 microns and 0.5–8.0 microns. Filament growth followed random paths forming loops, spirals and other shapes. Growth rate varied inversely with catalyst particle size. The filaments stopped growing when the catalyst particle was completely covered with a carbon layer. Baker also studied the formation of carbon filaments from other hydrocarbon gases such as ethylene, benzene, 1,3-butadiene, allene and propyne ("Carbon," 13(3), 245–6 [1975]).

U.S. Pat. No. 4,565,683 (D. J. C. Yates and R. T. Baker) discloses FeO as a catalyst for carbon filament synthesis. The FeO, formed by steam treatment of Fe at 700° C., is reacted with acetylene or ethane at 700° C.

U.S. Pat. No. 3,816,609 discloses a process for the production of a hydrogen-rich stream from a hydrocarbon feed gas such as propane. The hydrocarbon feed is first converted to filamentary carbon using a supported Group VIII non-noble metal catalyst. The carbon is then gasified using steam to produce the hydrogen-rich gas stream.

U.S. Pats. No. 4,435,376 and 4,518,575 are directed to the synthesis of filamentary carbon from hydrocarbons and a (Ni,Ti)-based catalyst which has been promoted with phosphorus. The addition of phosphorus is claimed to result in filaments of decreased diameter and length and increased surface area, such that the "microfibrous carbon" is a good candidate as a reinforcing agent.

Department of Energy Report No. DOE/MC/14400-1551, described a process for making filamentary carbon by the catalytic reduction of a carbon-containing gas using iron as the catalyst. In one preferred embodiment of the process, carbon is deposited on an iron-based catalyst from a CO/hydrogen gas mixture in the 300°–700° C. temperature range at a pressure of 1–100 atmospheres. The carbon produced is called "ferrous carbon" and is described as fibrous, particulate material in which the metal catalyst particles are intimately dispersed as nodules throughout the fibrous carbon growth.

Koyama and Endo have developed a process for growing graphitic fibers at about 1000° C. in which a gaseous mixture of benzene and hydrogen is passed through a reaction pipe coated with very fine particles of Fe (Japan Economic Journal, 17 [December 1981]). The fibers are reported to grow in a two-stage process (J. Crystal Growth 32(3), 335–349 [1976]). The growth process begins with the catalytic formation of very thin filaments which are then thickened by the pyrolytic deposition of carbon. The carbon fibers are typically 10 microns in diameter and several cm long. A 1982 Showa Denko K. K. patent (Japanese Kohai No. 57/117622) discloses that carbon filaments may be prepared by carbonizing a gaseous mixture containing benzene and hydrogen at 1000° C. in the presence of Fe particles with a particle size less than 0.03 microns or the use of a suspension of Fe particles sprayed into a reaction chamber at 1000° C. with a flowing mixture of benzene and hydrogen (Japanese Kohai No. 58/1180615).

G. G. Tibbetts and co-workers at General Motors developed processes for the growth of carbon filaments using methane or natural gas as the hydrocarbon gas at about 1000° C. Catalyst particles are obtained from carburized stainless steel tubes (U.S. Pat. No. 4,391,787) or by wetting the inside of steel tubes with an aqueous ferric nitrate solution ("Carbon" 23(4), 423–430 [1985]), or by growing a thick layer of oxide on the inside of the tube (U.S. Pat. No. 4,497,788). Also disclosed is a process for growing graphite fibers on a ceramic substrate pretreated by evaporating a ferric nitrate solution to deposit an iron compound (U.S. Pat. No. 4,565,684). In the first of two carbon-growth stages, a mixture of 5–15 vol% methane and hydrogen is passed over the ceramic heated to between 600°–1200° C. (preferentially 1000°–1100° C.). During this stage catalytic growth of thin carbon filaments occurs. The second growth stage is then initiated by increasing the methane concentration in the gas to 25 vol% of higher. This results in the thickening of the filaments due to pyrolytic deposition of carbon into fibers with diameters between 5–15 microns and 1–3 cm long.

In 1974 Nishiyama and Tamai ("J. Catal.," 33(1), 98-107 [1974]) reported the formation of fibrous carbon on Ni/Cu alloy sheets and alloy powders from the decomposition of benzene in the 580°-900° C. temperature range. For both the sheet and powder cases, a large number of metallic particles were present in the carbon possessing the same composition as the substrate. For the catalysts in both the sheet and powder form, the deposition rate was higher for the alloys containing 40-80% Ni than for pure Ni. In some follow-up work in 1976 the authors reported on the beneficial effect of adding hydrogen to the benzene stream on the rate of formation of the fibrous carbon under certain conditions ("J. Catal." 45(1), 1-5[1976]).

In 1985, Bernardo et al ("J. Catal." 96(2), 517-534 [1985]) studied the deposition of carbon on silica supported Ni/Cu catalysts from a methane-steam mixture at 500°-900° C. The carbon deposits from alloys with 50-100% Ni were filaments with a less dense core and a metallic particle at the tip.

Neither Nishiyama and Tamai, nor Bernardo et al. discovered the surprising space-filling capability of filamentary carbon growth from Cu/Ni catalysts when ethane or ethylene are used as the hydrocarbon feed gas in the temperature range 500°-700° C. Neither did these workers report the primarily bi-directional, and at times multi-directional, growth pattern characterizing the process of this invention.

BRIEF SUMMARY OF THE INVENTION

The present invention is a net-shape microcomposite structure which is made by a versatile process which overcomes the limitations of today's composite technology. The process relies on the catalytic growth of carbon filaments at temperatures typically less than about 1000° C. from gas-phase precursors. An example is the catalytic growth of thin filaments of carbon from gaseous hydrocarbons, e.g., ethane at 700° C. The specific process of this invention involves rapid catalytic growth of carbon filaments which eventually expand to fill the available space in a shaped mold. Furthermore, it is in the nature of the growth process that the filaments intertwine to form a three-dimensional random weave (self-woven network), which has some structural integrity as a free-standing form. By appropriate choice of catalyst particles, filaments as small as 0.01 micron in diameter can be produced.

The carbon networks can be further modified with one or more of several surface treatment techniques, e.g., chemical vapor deposition, electrodeposition, electro-less deposition, to tailor the structure and properties of the filamentary network. An example is the chemical vapor deposition of pyrolytic graphite on the original carbon filaments for improved strength, and subsequent electrodeposition of nickel to promote wetting to an aluminum matrix.

Thus, it is clear that this invention, as will be described below, overcomes the limitations of existing composite technology. The new capabilities provide the opportunity to produce composite structures directly to net shape with minimum handling and with an isotropic reinforcement in thin section.

DETAILED DESCRIPTION OF THE INVENTION

Figure 1:
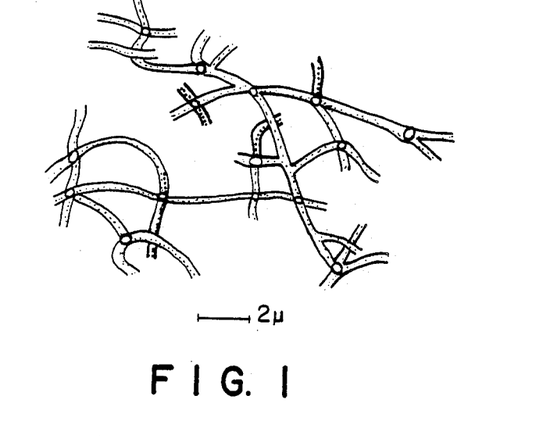
FIG. 1 shows a random interwoven network of carbon filaments. The bright dots in the filaments represent catalyst particles.

The reinforcing elements for the synthesis of the microcomposites of this invention are carbon filaments grown catalytically at elevated temperatures using hydrocarbon gases and a metal alloy catalyst. The carbon filaments range in diameter from 0.01 micron to about 2 microns, may be several hundred microns long and are grown in a randomly intertwined network, see FIG. 1, at a volume density ranging from about 2% to about 20%.

Figure 2:
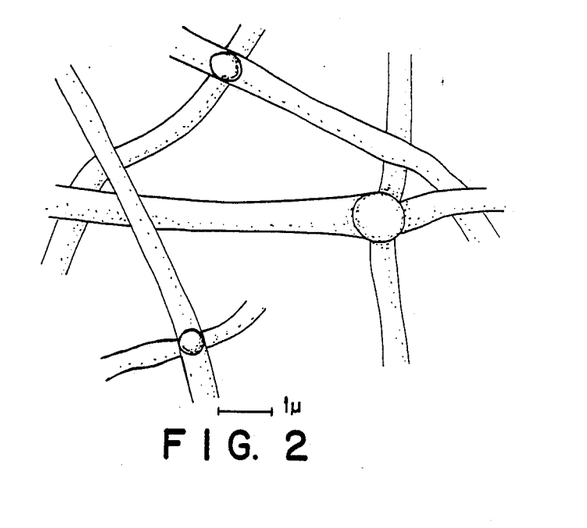
FIG. 2 particularly shows the catalyst particles in the filaments. The diameters of the filaments are clearly a function of the diameter of the catalyst particles and bi-directional growth of carbon filaments from single catalyst particles is evident.
Figure 3:
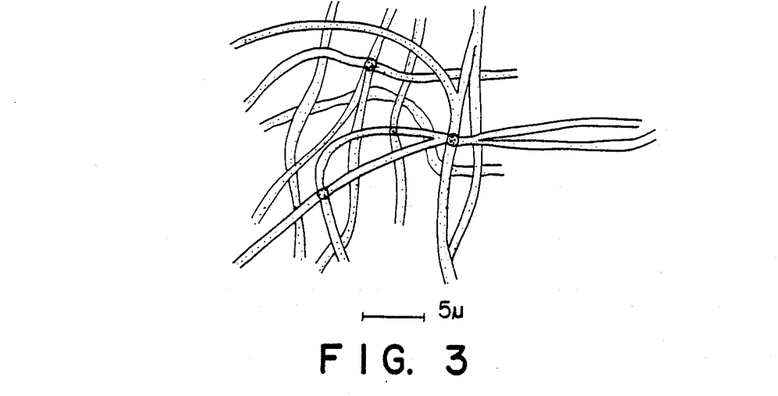
FIG. 3 shows an example of multi-directional growth from a single catalyst particle. The multi-directional growth is particularly evident from the catalyst particles A, B, C and D.
Figure 4:
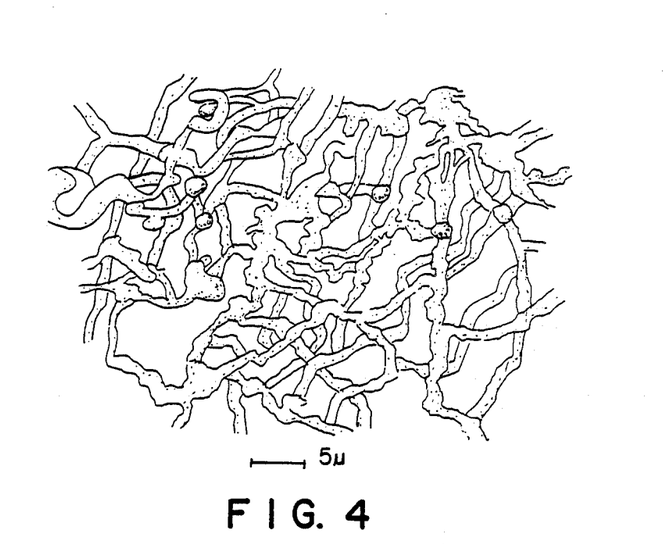
FIG. 4 shows a filamentary carbon network that has been coated with a ceramic material.

The carbon filaments are further characterized in that they predominantly show a bidirectional, see FIG. 2, and at times a multidirectional, see FIG. 3, growth mode. Thus, more than one carbon filament grows from a single metal catalyst particle. Further, there is generally a one-to-one correspondence between the diameter of the catalyst particle and the diameter of the carbon filament.

The filaments may be modified by coating them with another material using chemical vapor deposition.

Figure 6:
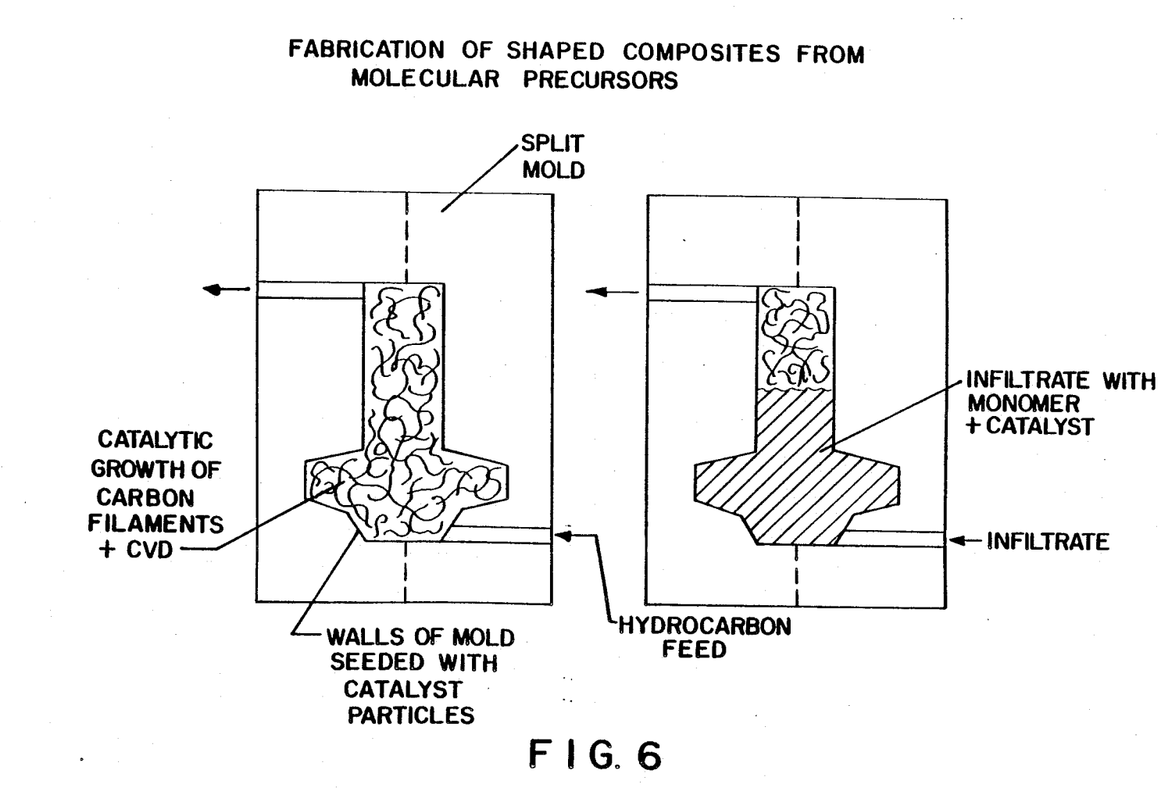
FIG. 6 shows a cross-sectioned view of a mold for forming microcomposites.
Figure 7:
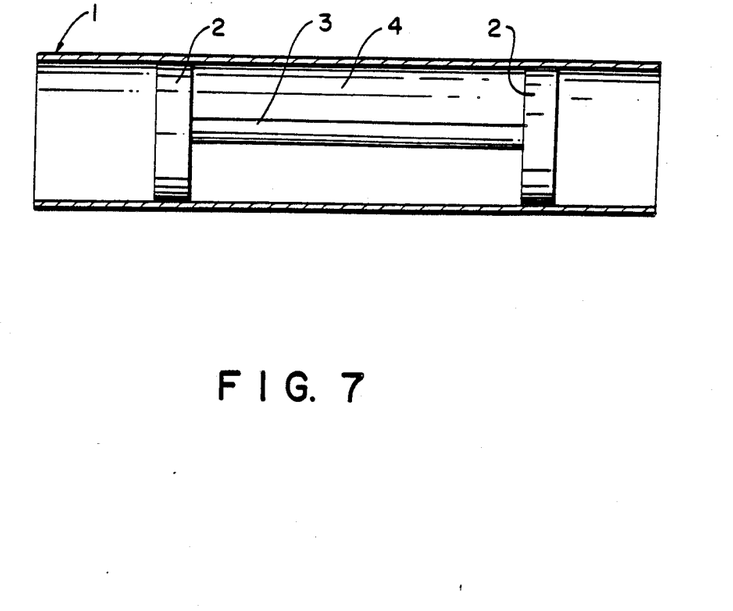
FIG. 7 shows in cross-section, a reactor and mold for forming a cylindrical, hollow net-shape microcomposite. 1 is a 2.5 centimeter (cm) quartz tube, 2 is glass frits, 3 is a 1.25 cm graphite rod and 4 is mold cavity defined by the wall of the quartz tube and the glass frits.

The invention is illustrated diagramatically in FIGS. 6 and 7. In the first step of the process, the filamentary carbon network is formed in-situ within a mold by catalytic decomposition of the hydrocarbon feed, utilizing metal alloy catalyst particles that are applied to the walls of the mold. The seeded mold is placed into a furnace or heated externally to the desired temperature and a hydrocarbon gas is allowed to flow through the mold. The filamentary network is permitted to grow until the mold cavity is filled with the desired volume fraction of filaments. The natural tendency of the random weave of filaments uniformly to fill the available space in the mold ensures faithful replication of the internal surface features of the mold, as well as isotropic reinforcement in the final composite. The filaments may then be modified by chemical vapor deposition (CVD) for example.

In the second step of the process, the matrix material is introduced as a liquid, and allowed to fill up all available space between the filaments in the mold, thereby forming the shaped composite structure. The infiltrant (matrix) is a polymetric material, but it could also be a metallic or ceramic material. The resulting shaped composite part, manufactured without any traditional handling, is removed from the mold, and the mold is recycled.

Thin section composites may be synthesized by this process by choosing catalyst particles that are significantly smaller than about 1 micron. Since there is a one-to-one correspondence between the diameter of a filament and the dimensions of the catalyst particle, clearly a thin section, say less than 1 millimeter thick, may be filled with a random weave structure of ultrafine carbon filaments without any handling.

The catalytically grown carbon filaments may be modified by coating them with another material using chemical vapor deposition. The CVD coating is applied by passing an appropriate volatile precursor through the filamentary carbon network inside the mold at an appropriate temperature as is well known to those skilled in the art of chemical vapor deposition and infiltration. Any desired thickness of a shape conforming coating (deposit) of a ceramic, metal or carbon may be applied to the network of carbon filaments.

Such flexibility in filament processing is particularly advantageous, because it opens up new possibilities for designing filaments with specific bulk or surface properties. In many metal matrix composite systems, resistance of the filaments to dissolution in the melt is an essential requirement. For example in the fabrication of single crystal composite turbine blades, utilizing investment cast ceramic shell molds, only a few CVD-coated filaments, e.g., $Al_2O_3$, $ZrO_2$, $HfO_2$-coated filaments, would resist dissolution in the melt. On the other hand, in lower melting point alloy systems, the most challenging problem is to achieve good wetting between matrix and filament to ensure proper melt infiltration and composite strengthening. Coating of the carbon filaments with a thin layer of nickel by CVD is one way to ensure good wetting with aluminum alloys, for example.

An intriguing aspect of chemical vapor deposition is the deliberate construction of artificial nano-scale multilayers on the original filaments. When the scale is sufficiently fine enough, it should be possible to exploit the well-known super-modulus effect for achieving exceptional stiffness of the composite filament. Controlling interfacial bond-strength between layers in a multi-layer structure is another method of improving fracture toughness.

The matrix material (infiltrant) may be a polymer, elastomer, metal, alloy or a ceramic and is used in a liquid state during infiltration of the filamentary network. Polymer infiltration may also be achieved by an in-situ process where the monomer is allowed to polymerize inside the mold.

Although it is well known that several transition metals, primarily Co, Ni and Fe, will act as catalysts to convert hydrocarbon gases and CO to filamentary carbon, no catalysts have been identified that will produce a rapid, voluminous growth that tends to fill available space. Our discovery that certain alloy systems will produce such a growth now makes possible the synthesis of net-shape isotropically reinforced microcomposites.

We have discovered that two classes of metal alloy systems yield such space-filling growths. Both classes are distinguished by metal combinations that form a series of solid solutions over their whole composition range and are a combination of a transition metal which is known to be a relatively good catalyst for filamentous carbon growth and one which shows no catalytic activity whatever, or one which is a poor catalyst.

The preferred alloy system of the first type is based on the system Ni/Cu, an example of a Group VIII metal, Ni, that is known to be a catalyst for filamentous carbon formation, and a Group IB metal, Cu, that is not a catalyst for filamentous carbon formation. Ni and Cu form a series of solid solutions over their whole composition range. The preferred composition range for the purposes of this invention is from about 20 wt% Ni to about 90 wt% Ni, with the range from about 40 wt% Ni to about 80 wt% most preferred.

When Ni is used as a catalyst for the formation of filamentous carbon from ethane or ethylene, the filaments tend to be relatively short with an aspect ratio of about less than 10 and the Ni catalyst particle is found at the tip of the filament. The Ni tends to become deactivated relatively quickly, most likely by being coated with a layer of carbon restricting further access of the hydrocarbon molecules. This results in a relatively inefficient process and relatively small yields of carbon per gram of catalyst and very little intergrowth of the filaments. Unexpectedly when Cu is added to the Ni, the alloy catalyst forms very long filaments with aspect ratios generally greater than about 200. The actual aspect ratio is now known definitively because it is difficult to find the ends of any one particular filament in the intertwined network.

Filaments grown from Ni/Cu allows are further distinguished from those grown from Ni by the location of the catalyst particle within the filament. Rather than being at the tip of the filament, the catalyst particle is predominantly found at the midpoint of two filaments. Thus a single catalyst particle is found to grow two carbon filaments in opposite directions. The two filaments are believed to grow simultaneously. We have also observed instances of a single Ni/Cu particle growing as many as six carbon filaments, suggestive of the six faces of a cube, all active for the growth of a carbon filament. This extraordinary multi-directional growth is believed to be responsible for the remarkably rapid and space-filling tendency of filamentary carbon growths from the Ni/Cu systems. Although previous workers have reported that the addition of Cu to Ni increases the latters activity for filamentary carbon growth, the predominantly bi-directional growth and the space-filling ability of this catalyst system when used with ethane or ethylene as the hydrocarbon gas was not recognized. Previous workers used benzene and methane as the hydrocarbon gases.

We have also discovered that other combinations of Group VIII-IB solid solution metal alloys such as Ni/Au, Co/Au, Fe/Au and Co/Cu also show significantly enhanced catalytic activity over the pure Group VIII metal and that the alloy systems produce predominantly bi-directional carbon filament growths. As in the case of the Ni/Cu system, these alloys are combinations of known catalysts for filamentous carbon formation, namely Ni, Fe and Co, and a non-catalyst, namely Cu and Au.

A preferred example of the second class of metal alloy catalyst is the Ni/Pd system. Ni and Pd also form a series of solid solutions over their whole composition range. Whereas Ni is a relatively active catalyst for filamentary carbon growth, Pd is a relatively poor catalyst. When an alloy of Ni/Pd of about 50/50 wt% is used with ethane or ethylene, an almost "explosive" type of filamentary carbon growth is obtained. Like the Group VIII-IB combinations described above, the carbon growth tends to fill all available space, but at a much more rapid rate, in minutes rather than in tens of minutes. The carbon filaments are also found to be predominantly bi-directional, i.e., at least two carbon filaments grow from a single catalyst particle. Because of the very rapid space-filling growth with this catalyst system, the carbon growth tends to be of a very low volume density, typically about 2 vol% rather than the more common 5 to about 10 vol% within the Ni/Cu system. Another novel and distinguishing feature of this type of growth is that it tends to be "sponge-like" with some resiliency reminding one of sponge-rubber. Such a filamentary carbon growth has not been reported heretofore. The reason for this latter property is not understood.

The unexpected and newly discovered beneficial nature of the addition of Pd to Ni has also been observed with another Group VIII base metal/pd combination which forms a solid solution, namely Co/Pd. In this case also, the alloy system shows significantly higher catalytic activity for carbon growth than the non-noble Group VIII metal, the carbon filaments are predominantly bi-directional and the carbon growth has some resiliency and tends to fill available space.

The preferred form of the catalyst is a fine powder, although bulk forms such as rolled sheet or thin films may also be employed. There appears to be an approximate one-to-one correspondence between the size of the catalyst particle and the diameter of the carbon filament and generally carbon filaments with diameters less than about 1 micron are preferred for the purposes of this invention. Surprisingly even when bulk material or powder significantly larger than 1 micron, up to 40 microns for example, is used, the alloy disintegrates during the filamentary carbon growth process such that particles ranging in size from about 0.01 micron to about 2 microns are generated. The process responsible for this advantageous disintegration is believed to be similar to one known as "metal dusting."

For some applications it may be preferred to manufacture approximately monodisperse carbon filaments, i.e., filaments with substantially the same diameter. In this case it is clearly advantageous to start with alloy catalyst particles that are all substantially of the same diameter and of a size substantially equal to the desired diameter of the carbon filaments. Such alloy powders could be produced by aerosol production from the melt or by thermal evaporation at relatively high pressures such that a metal "smoke" is generated, or by pyrolysis of a volatile organo-metallic precursor.

Alloy particles may also be synthesized in-situ in a mold if desired. Such well-known techniques as evaporating an aqueous solution of the salts of Ni and Cu, e.g. nitrates, chlorides, etc., followed by calcining to the metal oxides and then reducing the oxides to the metal alloy by heating in hydrogen, may also be employed. The concentration of the metal salts is adjusted such that the desired alloy composition is obtained. The walls of a mold could thus be seeded with the desired metal alloy catalyst by wetting the walls with the starting aqueous solution and forming the metal alloy particles in-situ. Another technique that may be employed is to deposit films of the constituents metals onto the walls of the mold by electroplating or electro-less plating, for example, and then heating the deposited films to form the alloy by interdiffusion. When the hydrocarbon gas is introduced into the mold, the film will disintegrate during the filamentary carbon growth process.

Minor impurities in the metal catalyst do not appear to have significant effects. Thus, Monel powder of nominal 70 wt% Ni and 30 wt% Cu compositions with less than about 1 wt% each of Mn and Fe as impurities has been found to be as useful as nominally pure Ni/Cu alloys. Ni/Cu sheet of nominal 55 wt% Ni and 45 wt% Cu composition with minor amounts of Mn and Fe has also been found to be an effective catalyst for filamentary carbon growth.

It has been found that one gram of Ni/Cu alloy catalyst can generate at least 100 gm of filamentary carbon before the catalyst particles become inactive. The actual catalyst loading of a mold can therefore be adjusted such that the desired volume density is achieved. The metal alloy particles can at least in part be leached out of the carbon filamentary network with acids if so desired.

Hydrocarbon gases may be converted to a form of carbon by thermal pyrolysis alone. This carbon may be either in particulate form, commonly known as soot, formed by gas phase nucleation and practiced in the manufacture of carbon black, or in thin film, pyrolytic form when hydrocarbons are decomposed at very high temperatures, generally above about 900° C. The latter is essentially an example of a process more commonly known as chemical vapor deposition.

Catalytic filamentary carbon growth requires contact between a metal catalyst particle at elevated temperatures and a carbon-bearing gas. Although a number of gases such as CO and various hydrocarbon gases have been used in the past, the preferred gases for the purposes of the present invention are ethylene and ethane. Formation of soot or pyrolytic carbon reduces the overall efficiency of the process and may interfere as well with the catalytic activity of the metal catalyst particles, and is therefore avoided in the practice of this invention.

It has been proposed by Baker that carbon source gases that undergo an exothermic decomposition reaction to elemental carbon are required for filamentary carbon growth. Thus gases such as CO, acetylene, ethylene and butadiene readily form filamentous carbon, whereas gases such as methane should not. Filamentous carbon growth from methane is believed to require the thermal conversion of the methane to less stable molecules prior to catalytic conversion to carbon.

For the purposes of this invention, the hydrocarbon gases are chosen such that they form insignificant amounts of soot or pyrolytic carbon under the processing conditions, i.e., they will decompose to carbon only in the presence of the metal alloy catalyst. Ethylene is preferred in the temperature range 550° to 650° C., while ethane is preferred in the temperature range 650° to 750° C. It is clear, however, that if one wishes to coat the already formed carbon filaments with a layer of pyrolytic carbon, the temperature may be raised or other less thermally stable hydrocarbons may be used.

Ethane and ethylene, the preferred hydrocarbon source gases of the present invention, are readily available and relatively inexpensive. Ethane requires somewhat higher temperatures for filamentous carbon growth than does ethylene. The reason for this is believed to be that the ethane first needs to be converted to ethylene by pyrolysis before the metal alloy catalyst can form filamentous carbon.

Benzene is relatively expensive and carcinogenic, while CO is also highly toxic. Methane is found to require very high reaction temperatures, above about 900° C., for any filamentary carbon growth to occur with the alloy catalysts of the present invention. Under these conditions, pyrolytic carbon deposition also takes place which tends to coat the catalyst particles with a layer of carbon and render them inactive relatively quickly.

Acetylene will form filamentary carbon with Ni/Cu alloy catalysts at temperatures as low as 300° C. Pure acetylene, however, has a tendency to readily form soot due to pyrolysis at temperatures as low as about 450° C.

The purity of the feed gases does not appear to be a critical factor. So-called "chemically pure" grades, approximately 98% purity, of ethane and ethylene have been used successfully without further purification. Although it is likely that some impurities such as hydrogen sulfide may poison the alloy catalysts, this is not known at the present time. Although nominally pure ethane and ethylene are preferred, mixtures of these two gases, as well as mixtures with inert gases such as nitrogen or argon may also be employed. It has also been found that the deliberate addition of hydrogen in the range from about 10 vol% to about 90 vol% prolongs the time that a Ni/Cu catalyst remains active. We speculate that the hydrogen keeps the catalyst particles relatively free of deposited carbon films.

Under the preferred conditions, as much as 80 mole% of the ethylene or ethane being fed to the reactor has been converted to carbon in the form of carbon filaments. The by-products of this decomposition have been analyzed by gas chromatography and found to be primarily hydrogen, with some methane, as well as smaller amounts of simple saturated hydrocarbon molecules such as propane and butane.

Any unreacted feed gas may be partially recycled, i.e., mixed with pure feed gas to make the process even more efficient. The effluent gas stream from the reactor may also be used as the source of hydrogen if that is desired during the filamentary growth.

The temperature range available for the practice of this invention with the preferred catalyst systems, i.e., Ni/Cu or Ni/Pd, is from about 300° C. to about 800° C. and is determined primarily by the hydrocarbon gas used. At lower temperatures the rates of carbon growth are not sufficiently rapid, while at higher temperatures, the catalyst particles tend to become coated with carbon coating rendering them inactive.

It has been shown that, for Ni/Cu and acetylene, temperatures as low as 300° C. may be used. For ethylene the temperature may range from about 500° C. to 650° C. For ethane, the temperature may range from about 650° C. to about 800° C. In the latter case it is believed that the ethane needs to be pyrolyzed or thermally converted to ethylene before it can be catalytically converted to filamentary carbon. Thus, one can envision preheating the ethane to the required temperature and then letting it contact the catalyst at a lower temperature.

Although this invention has been practiced only in an isothermal mode, there may be advantages to growing the filaments at different temperatures in order to control how quickly and uniformly the filamentary network fills up a mold. High temperature heat treatments as high as 2500° C. and above are also contemplated in order to graphitize the carbon filaments. The temperature used for coating the filaments by chemical vapor deposition, if practiced, is chosen to fit the precursor and rate of deposition desired, as is well known in the art.

Flow rates are chosen to optimize the growth rate of the carbon filaments and are better defined in terms of residence or contact time. A typical contact time is of order of 20 sec, although shorter as well as longer contact times have been used successfully. The actual flow rate used will depend on the volume of the mold (or reactor) and the processing temperature and is adjusted to achieve the desired residence time. Very short residence times result in relatively inefficient use of the hydrocarbon gas.

Although the invention has been practiced only at ambient atmospheric pressure, it is well known that catalytic filamentary carbon can be synthesized at pressures below and above atmospheric pressure as well. Chemical vapor deposition is generally practiced at atmospheric pressure, or subatmospheric pressure.

Although the present invention addresses the synthesis of composite structures, it is clear that the as-grown filamentary networks, with or without the benefit of chemical vapor deposition surface modification, and, or selective oxidation, have utility in their own right. Carbon filaments or chemical vapor deposition coated carbon filaments may be employed as porous structures and materials, for example as catalyst supports, filtration media, and thermal insulators.

The carbon filaments are electrically conductive and thus may also find utility as high surface area battery electrodes or in electrically conducting membranes.

The catalysts disclosed in this invention are highly efficient in converting certain hydrocarbons to carbon, with the major byproduct being hydrogen gas. This same technology, therefore, at least as practiced in the synthesis of carbon filaments, can also be considered as a means of converting hydrocarbons to hydrogen, valuable both as a fuel as well as chemical.

EXAMPLE 1

Two pieces of metal foil, one made of Ni, the other of Ni/Cu alloy were placed in a 2.5 centimeter diameter quartz reactor inside a 90 cm long furnace and heated to 700° C. under Argon flowing at 200 cc/min. The nominal composition of the alloy was about 45 wt.% Ni, 55 wt.% Cu and less than 1 wt.% of Fe and Mn. The growth of filamentary carbon could be observed through an optical window at the exit of the quartz reactor. At temperature, the Argon was replaced by flowing ethane at 100 cc/min. After 2 hours, the ethane was purged with Argon and the reactor cooled down. The Ni foil had an approximately 2 mm thick black growth of filamentary carbon on it and the weight increase of the sample gave a growth rate of ~20 mg/hr per $cm^2$ of geometric surface area. The Ni/Cu foil in contrast had grown a 13 mm thick dense layer of carbon which extended to the walls of the quartz tube. The weight increase of the sample gave a growth rate of approximately 200 mg/hr per $cm^2$ of geometric surface area. The Ni/Cu foil was embedded in the center of the filamentary carbon growth and mechanically intact. FIG. 2 shows the bidirectional carbon filaments grown from the Ni/Cu foil in an SEM (Scanning Electron Microscope) photomicrograph. This example demonstrates the greater catalytic activity of the Ni/Cu alloy over pure Ni above and the space-filling tendency of the carbon filaments from the Ni/Cu alloy. The catalyst particles in the filaments were examined by x-ray analysis and found to contain both Cu and Ni.

EXAMPLE 2

Example 1 was repeated but no metal catalyst was placed in the quartz reactor. After 2 hours, the quartz tube was inspected and found to contain no carbon deposits showing that under these conditions, no pyrolysis takes place and the filamentary carbon is a catalytic product.

EXAMPLE 3

Example 1 was repeated but the quartz reactor was loaded with a piece of high purity Cu foil. No filamentary carbon growth occurred and the Cu foil gained no weight, showing that Cu is not a catalyst for filamentary carbon growth.

EXAMPLE 4

Example 1 was repeated except that in addition to the Ni foil and Ni/Cu foil, a third sample of Ni/Cu powder (Cerac; 70/30 wt.%) was also included. The Ni/Cu powder grew a plug of filamentary carbon which filled the diameter of the quartz reactor and was about 15 cm in length. The initial and final weights were Ni: 0.2349 g 0.2357 gm; Ni/Cu foil: 0.3996 1.0749 gm; Ni/Cu powder: 0.409 gm 6.8870 gm.

EXAMPLE 5

A commercial Ni/Pd based melt-spun alloy (Allied Chemical) was exposed to ethylene at 600° C. in a quartz reactor as in Example 7. After an induction period of about 2 minutes, filamentary carbon growth started and filled the full diameter of the quartz reactor in approximately 5 minutes. No further growth appeared to occur after approximately 15 minutes. The resulting filamentary growth had a sponge-like quality, less dense than growths for Ni/Cu powders or Ni/Cu foil. Scanning Electron Microscope (SEM) examination of the carbon filaments showed mainly bidirectional growth, similar to FIG. 2 of Example 1, from single catalyst particles. The latter contained Pd and Ni by x-ray analysis.

EXAMPLE 6

A 13 mm diameter Cu pipe was coated with Ni using commercial electroless Ni and placed in a clean quartz reactor. The conditions of Example 1 were repeated except that 10% H2 in Argon at 200 cc/min. was run for 1 hour, followed by ethane at 100 cc/min. for 4 hours. At the end of the experiment, the Cu pipe was completely filled with a growth of filamentary carbon. X-ray analysis of the catalyst particles in the carbon filaments showed Cu, Ni and some P. The P is known to be present in the initial electroless Ni deposit. It is believed that the initial heat treatment, for 1 hour in this case, formed a Ni/Cu alloy surface layer on the internal of the Cu tube which provided the Ni/Cu catalyst particles. The P does not appear to impede the catalytic process. This example also illustrates the space-filling ability of the filamentary carbon grown for Ni/Cu alloys. No carbon growth occurred on the external surface of the Cu tube since Cu is non-catalytic (as shown in Example 3).

EXAMPLE 7

A quartz substrate was coated by partially overlapping 0.3 micron thick films of Cu and Ni produced by sputter deposition. The coated quartz slide was placed in a quartz reactor as in Example 1 and heated to 600° C. in a 10% $H_2$/Ar mixture and kept at 600° C. for 1 hour. The gas was then changed to ethylene at 100 cc/min and the experiment continued for 1 hour. The part of the slide covered by Cu remained shiny with no carbon growth; the Ni region was visibly dark with a carbon growth less than 1 mm thick whereas the overlapping Ni/Cu region had a growth of carbon approximately 8 mm in thickness. The heat treatment before exposure to the hydrocarbon gas caused the Cu and Ni films to interdiffuse and form a Ni/Cu alloy. The experiment demonstrates, as Examples 1, 2 and 3 that Cu is non-catalytic, and that the addition of Cu to Ni in alloy form greatly enhances the latter's activity for filamentary carbon formation.

EXAMPLE 8

Example 7 was repeated except that the Cu film was replaced by a sputtered film of Au. The results were similar showing that Au is non-catalytic and that a Ni/Au alloy is more active than Ni alone. By x-ray analysis, the catalyst particles in the carbon filaments contained both Ni and Au.

EXAMPLE 9

Example 7 was repeated except that the Cu was replaced by a sputtered film of Ag. The Ag area remained shiny showing that Ag, like Cu and Au, is non-catalytic for carbon formation. The overlapping Ni/Ag region showed areas where more carbon filaments grew than in the Ni region. The interpretation is that Ni/Ag solid solutions are more difficult to form than solid solutions of Ni/Cu or Ni/Au, but that Ag can also enhance the catalytic activity of Ni for filamentary carbon growth.

EXAMPLE 10

Example 7 was repeated except that the Ni film was replaced by Pd and the Cu film by Au. After exposure to ethylene at 600° C., the Pd region showed only a slight blackening, the Au region remained shiny whereas the Pd/Au region showed an 0.7 mm thick growth of filamentary carbon. The experiment demonstrates that the addition of Au to Pd, which form a solid solution, greatly enhances Pd's activity for filamentary carbon formation.

EXAMPLE 11

Example 10 was repeated except that the Pd was replaced by a Co film. The Co/Au region showed a filamentary carbon growth approximately twice as thick as that of the Co region, showing that Au also enhances the catalytic activity of Co for filamentary carbon formation.

EXAMPLE 12

Example 7 was repeated except that the Cu film was replaced by a sputtered Pd film. The Ni region grew a filamentary carbon growth less than 1 mm thick, whereas the Ni/Pd region had a growth of filamentary carbon which was more than 10 mm thick in some areas. The Pd region showed only a spotty growth of carbon. This is an example of two Group VIII metals which form a solid solution where the alloys are catalytically more active than either metal alone.

Example 13

Example 12 was repeated except that the Ni was replaced by Co. The Co and Pd regions showed only partial blackening due to filamentary carbon growth, whereas the Co/Pd region showed a growth approximately 1 mm thick. This is another example of a Group VIII—VIII combination which is more active than either metal alone.

EXAMPLE 14

Example 1 was repeated except that the reactor was loaded with Ni/Cu powder and the ethane replaced by methane. At 700° C. no obvious carbon growth occurred. The temperature was increased in 50° C. steps and filamentary carbon growth was observed to begin at a temperature of approximately 900° C. Growth ceased after about 10 minutes and did not fill the diameter of the reactor. The walls of the quartz reactor showed a black carbonaceous deposit at the end of the run. The experiment demonstrates that $CH_4$ as a source gas requires temperatures which also induce pyrolytic deposition of carbon. This pyrolytic carbon quickly poisons the catalyst particles and impedes catalytic growth of carbon filaments.

EXAMPLE 15

A filamentary carbon growth from Ni/Cu powder catalyst as in Example 1 from ethane at 700° C. was further treated by coating it with $SiC_xN_y$ chemical vapor deposition (CVD) coating derived from the pyrolysis of Hexamethyldisilazane (HMDS). After the growth of the filamentary carbon, the ethane was replaced by Argon saturated with HMDS vapor by bubbling the Argon through a reservoir of liquid HMDS. The CVD infiltration was carried out for 3 hours. Scanning electron microscope (SEM) and X-ray examination of the carbon filaments after this HMDS exposure showed that the carbon filaments were coated with a conformal Si containing layer. The experiment demonstrates the in-situ production of CVD modified filamentary carbon growths which could then be used as reinforcing agents for bulk composites.

EXAMPLE 16

Example 15 was repeated except that the HMDS was replaced by Tetraethoxysilane and the temperature was lowered to 550° C. during the CVD infiltration. This precursor is known to deposit $SiO_2$ coatings. SEM examination verified that the carbon filamentary growth was conformally coated with a Si containing layer, believed to be $SiO_2$.

EXAMPLE 17

Figure 5:
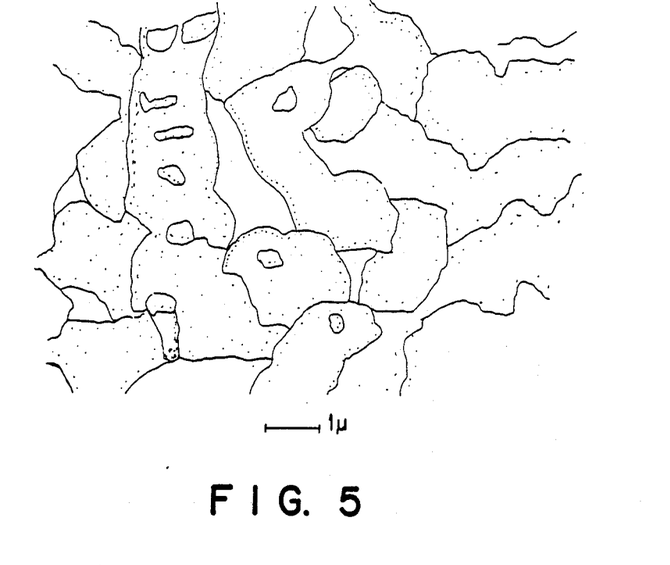
FIG. 5 shows the same coated network at a higher magnification.

Example 15 was repeated except that liquid HMDS at a rate of 1 ml/min was injected into the reactor after raising the temperature to 900° C. The higher temperature was chosen to achieve high deposition rates. After a 30 minute exposure, the sample was cooled and removed from the reactor. The filamentary carbon growth now had a ceramic-like appearance and after fractioning was examined in a SEM. FIGS. 5 and 6 show photomicrographs of such a fracture surface. The 0.2 micron filamentary carbon is visible extending from the conformal $SiC_xN_y$ coating. The composite growth is not fully dense but bridging of the filamentary growth is clearly evident.

EXAMPLE 18

A filamentary carbon growth from a Ni/Cu foil experiment as in Example 1 was placed into a mold press and impregnated with a low viscosity epoxy resin (E. F. Fuller, Inc.). The mold was heated to 50° C. under pressure and allowed to cool overnight. The resulting filamentary carbon reinforced epoxy composite was sectioned and examined in an SEM. The filamentary carbon growth was found to be completely and uniformly infiltrated by the epoxy resin.

EXAMPLE 19

A mold, shown diagrammatically in FIG. 7, consisting of a 1.25 mm diameter graphite rod supported by two porous glass frits at either end was seeded with powdered Ni/Cu catalyst by sprinkling the powder onto the graphite rod. The mold was placed into a 2.5 cm quartz reactor as in Example 1 and after heating to 600° C. exposed to ethylene at a 100 cc/min. flow rate for 4 hours. At the end of the run the mold was removed from the quartz reactor. A filamentary carbon growth had formed in the available space restricted by the walls of the quartz reactor, the graphite rod and porous quartz discs. The resulting tubular form of filamentary carbon was then infiltrated with an epoxy resin as in Example 18 giving a filamentary carbon reinforced epoxy composite tube.

What is claimed is:

1. An isotropically reinforced net-shape microcomposite structure produced by contacting one or more hydrocarbons which will catalytically decompose to form a filamentary carbon with a metallic catalyst for growing multi-directional carbon fibers in a mold at a temperature sufficient to form filamentary carbon and insufficient to cause the pyrolytic deposition of carbon, introducing a matrix material to fill the mold, converting the matrix material to a solid and releasing the structure from the mold.

2. The structure of claim 1 wherein the catalyst is a solid solution of two metals.

3. The structure of claim 2 wherein the catalyst is a Group VIII metal in solution with a Group VIII or Group I(B) metal.

4. The structure of claim 3 wherein the catalyst is nickel in solution with a metal selected from copper, gold, silver, and palladium.

5. The structure of claim 1 wherein the catalyst is selected from the group consisting of nickel-copper, nickel-palladium, nickel-gold, palladium-gold, cobalt-gold and cobalt-palladium.

6. The structure of claim 1 wherein the catalyst is a solid solution of nickel and copper.

7. The structure of claim 1 wherein the catalyst is a solid solution of nickel and palladium.

8. The structure of claim 1 wherein one or more conformal coatings are deposited on the filamentary carbon before the matrix material is introduced to the mold.

9. The structure of claim 8 wherein the conformal coating is carbon, a metal, a ceramic compound or mixture thereof.

10. The structure of claim 8 or 9 wherein the conformal coating is deposited by chemical vapor deposition, electroplating or electroless deposition.

11. The structure of claim 1 wherein the matrix material is a polymer, elastomer, epoxy resin, metal, alloy or ceramic.

12. The structure of claim 1 wherein the net-shape microcomposite structure has at least one section with a thickness of less than one millimeter.

13. The structure of claim 1 wherein the hydrocarbon is ethane, ethylene or a mixture thereof.

14. The structure of claim 1 wherein the net-shape microcomposite structure reinforcement is a three-dimensional random weave of carbon filaments.

15. The structure of claim 1 wherein the metallic catalyst is finely divided.

16. A net-shape microcomposite structure isotropically reinforced with a three-dimensional random weave of thin carbon filaments, produced by the method which comprises contacting a nickel-copper solid solution catalyst with ethylene in a mold to form a random weave of thin carbon filaments, at a temperature from about 450° C. to about 750° C., introducing a matrix material to the mold, converting the matrix to a solid and releasing the structure from the mold.

* * * * *